US005222254A

United States Patent [19]

Verron et al.

[11] Patent Number: 5,222,254

[45] Date of Patent: Jun. 22, 1993

[54] RECEIVER INCLUDING MEANS FOR ACQUISITION AND COMPARISON OF IDENTIFICATION DATA OF TWO TRANSMISSION CHANNELS

[75] Inventors: Francoise Verron; Serge Verron, both of Rambouillet, France

[73] Assignee: U.S. Philips Corporation, New York, N.Y.

[21] Appl. No.: 663,490

[22] Filed: Mar. 1, 1991

[30] Foreign Application Priority Data

Mar. 9, 1990 [FR] France ............................ 90 03025

[51] Int. Cl.[5] ........................................ H04B 17/02

[52] U.S. Cl. .............................. 455/186.1; 455/45; 455/186.2; 455/166.2

[58] Field of Search ............... 455/186.1, 186.2, 185.1, 455/184.1, 181.1, 166.2, 45; 375/98, 97

[56] References Cited

U.S. PATENT DOCUMENTS 4,881,273 9/1989 Koyama et al. ................. 455/186.1

OTHER PUBLICATIONS

Specifications of the RDS System, Chapter 2-enttiled: "Baseband Coding" (Data-Link Layer), pp. 11-12.

Specifications of the RDS System, Chapter-entitled: "Glossary of Terms for the Applications", p. 29.

*Primary Examiner*—Reinhard J. Eisenzopf

*Assistant Examiner*—Almaz Woldu

*Attorney, Agent, or Firm*—Edward W. Goodman

[57] ABSTRACT

A receiver, adapted to the reception of identification data in accordance with the RADIO DATA system (RDS) and having only one tuner, effects the acquisition of the identification code of an alternative channel by sampling the alternative channel during periods in which the audio output of the receiver is muted. These periods are of such a short duration that they are not noticed by the listener.

4 Claims, 2 Drawing Sheets

RECEIVER INCLUDING MEANS FOR ACQUISITION AND COMPARISON OF IDENTIFICATION DATA OF TWO TRANSMISSION CHANNELS

BACKGROUND OF THE INVENTION

1. Field of the Invention

The invention relates to a receiver including means for acquisition and comparison of signals from a first and a second channel of which at least the signals from the first channel, referred to as current channel, comprise a repetitive group of N data (N positive integral) particularly having its own identification code and at least a tuning search indication for searching said second channel, referred to as alternative channel, said receiver being tuned to the current channel whose identification code has been stored.

2. Description of the Related Art

An example of a channel as described above is known from the publication by the "European Broadcasting Union (EBU) no. 3244-F p. 11" in which the RDS system is described. This publication is herein incorporated by reference.

The RDS system is conceived in such a way that the car radio of a listener who is travelling can be automatically tuned permanently to the best transmitter transmitting the program selected by the listener.

Page 29 of the above-cited document states various known methods of "search tuning", i.e. searching an alternative transmitter whose channel is different from that of the transmitter which is being listened to, i.e. the so-called actual transmitter.

The installation of the RDS system is neither universal nor obligatory, nor is it immediately certain which aspects should be taken into account by the manufacturer of a car radio which is suitable for the RDS system, because there is a multitude of transmitters only some of which are provided with the RDS system at the transmitter end.

The invention is only applicable if the actual or current transmitter transmits in accordance with the RDS system, i.e. with a program identification code (PI code as indicated on page 12 of the above-cited document) and with at least an alternative frequency indication (AF code in a group of the OA type as indicated on page 16 of the above-cited document).

The technical problem posed by searching an alternative channel whose frequency is known and whose reception quality is better than that of the current channel because of the higher field strength is that, before substituting the alternative channel for the actual one, it is necessary to ensure that the program on the alternative channel corresponds to the program on the current channel. A vehicle which moves away simultaneously from a current channel transmitter and an alternative channel transmitter may capture a third channel transmitter whose frequency is equal or proximate to the frequency of the alternative channel but which does not transmit the same program.

The invention has for its object to effect an identity check before changing stations, which check takes place while the listener is listening to the current or actual program, without an annoying interruption of this program.

Page 29 of the above-cited document proposes 3 solutions, but none of them is satisfactory for a receiver comprising only one "RF input stage", i.e. a single tuner.

During acquisition of the identification code of the alternative channel it is either possible to mute the audio section of the receiver and in this case the listener is subjected to unpleasant periods of silence, or it is possible to keep the audio section in an active state, which may involve the risk that the listener is subjected to constant program changes, which will be the case in big cities with numerous local radio stations in a relatively small geographical area.

The invention has for its object to overcome this drawback.

SUMMARY OF THE INVENTION

According to the invention said means as described in the opening paragraph are particularly characterized in that they perform the following steps:

a) tuning said receiver to said alternative channel during a period 'd1' before resuming the reception of the current channel, said period 'd1' being shorter than the transmission period of a single group of N data, b) storing the alternative data transmitted by said alternative channel during said period 'd1', c) comparing the respective identification codes of the alternative channel and the current channel for:
   1. setting an equality signal, in the case of equality,
   2. proceeding to step d), in the case of inequality, d) comparing the number of said stored alternative data with the number N of data of a group for:
   1. waiting for a period 'd2' before returning to step a), in the case of "less than",
   2. setting an inequality signal, in the case of "more than or equal to".

The invention benefits from the fact that the listener's ear does not hear a very short interruption, for example, d1=0.02 second, even if this interruption is repeated at regular intervals to the extent where these intervals are sufficiently large, i.e. the period d2 is not chosen to be too short in combination with the period d1.

With the RDS system specifications, a period d1 of 0.02 sec corresponds to the acquisition of 23 bits whereas the repeated group comprises 104 bits (N=104) and the identification code comprises 16 bits.

It is advantageous when the period d2 corresponds to the transmission period of either 104+n.104 bits, or 58+m.104 bits ('n' and 'm' being positive integrals or zeros). Thus, the bits acquired during two successive periods of time d1 can be linked together and the chances of acquiring the 16 identification bits with a number of interruptions of less than 5 ($5\times23>104$) are improved.

The invention is also characterized in that in a receiver comprising a tuner, a control unit, a demodulator and a decoder, the method being carried out by means of an identification code comparator arranged in the decoder which sets a signal intended for the control unit.

BRIEF DESCRIPTION OF THE DRAWINGS

The invention will now be described in greater detail by way of a non-limitative example illustrated in the figures.

DESCRIPTION OF THE PREFERRED EMBODIMENT

Figure 1:
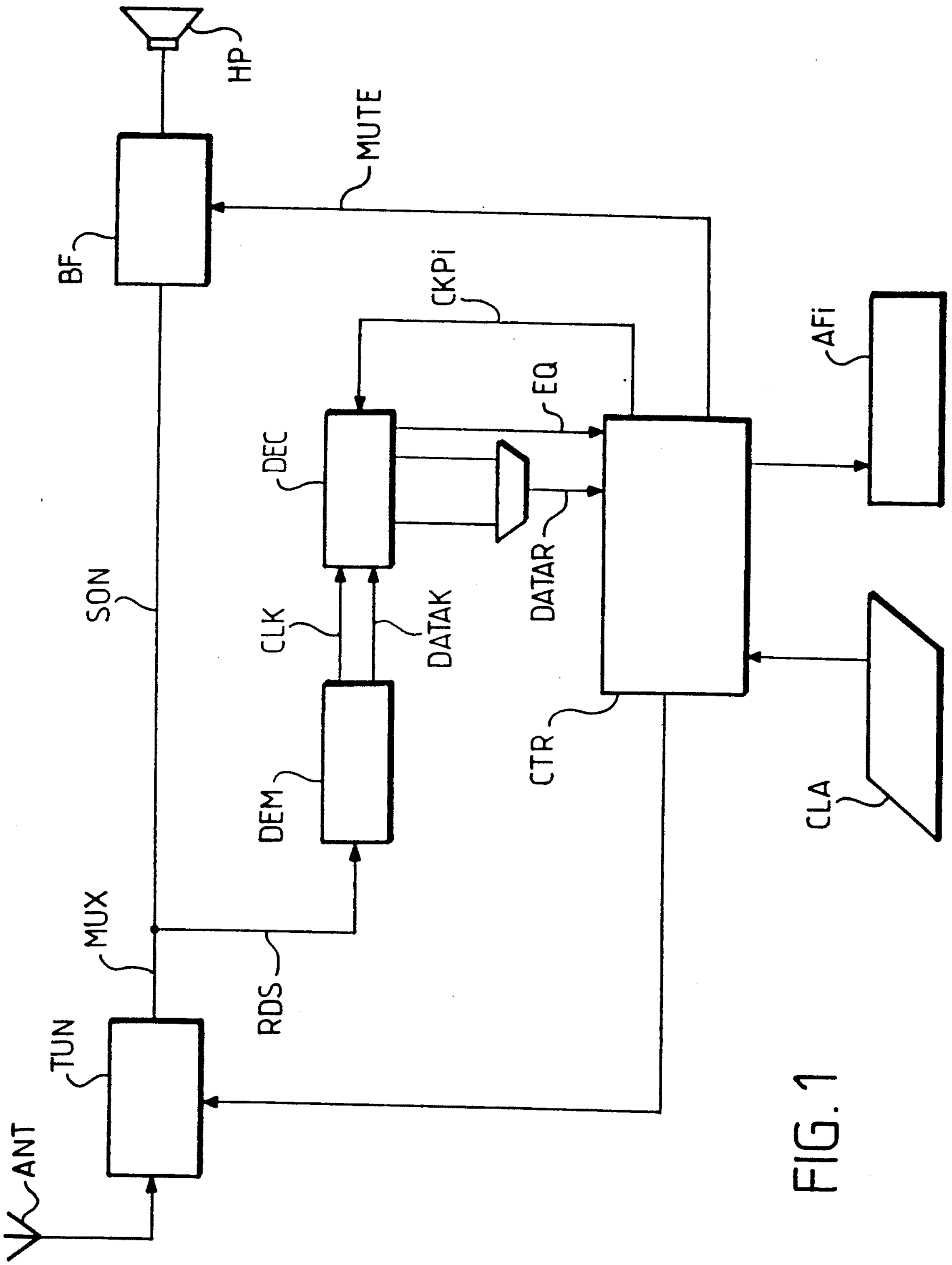
FIG. 1 shows the circuit diagram of a car radio according to the invention.

The car radio of FIG. 1 comprises the following known elements:

an antenna (ANT) whose signals are applied to a tuner (TUN), the tuner applies the signals from the chosen channel to a multiplex line (MUX) which signals are divided into one part carrying the audio modulation (SON) which is applied to an amplifier (BF) and then to a loudspeaker (H.P.), and another part carrying the digital modulation (RDS) which is applied to a demodulator (DEM), the demodulator is synchronized with the transmission of the digital RDS signals and applies them to at least two leads, namely a clock lead (CLK) and a digital serial data lead (DATAK), these two leads are connected to a decoder (DEC) which recognizes the start of each group of N data RDS and corrects the errors, if possible, in order to detect the PI of the current channel and to apply these data, for example, in the form of parallel data packets (DATAR) to the control unit (CTR), the control unit (CTR) is the "conductor" of the car radio whose principal functions will now be indicated:

it receives the commands from the user via the keyboard (CLA), it provides the information for the user by means of the display (AFI), it indicates to the tuner which frequency should be tuned to, it controls the amplifier settings (volume, balance, tone, . . . . ) and, as the case may be, it mutes the amplifier (MUTE).

In current car radios the control unit is a microprocessor programmed in the same way as the demodulator; the connections between the various modules mentioned above and other non-mentioned modules are numerous, but comprise neither the connection (CKPI) nor the connection (EQ) between the control unit and the decoder, which will be described hereinafter.

When the user listens to an RDS transmitter, i.e. to a current channel, the control unit in the car radio of FIG. 1 recognizes, via DATAR, the repeated groups of N bits (N=104=4 blocks of 26 bits) indicating the frequency(ies), i.e. the alternative channels of the geographically neighboring transmitters transmitting the same program.

At any instant the control unit detects whether the power received at each alternative channel is less or not less than the power received on the current channel (to realize this, the procedure as described in U.S. Pat. No. 4,641,367 may be used). If the channel is to be changed at a given moment, it should be verified beforehand whether the same program is concerned.

Figure 2:
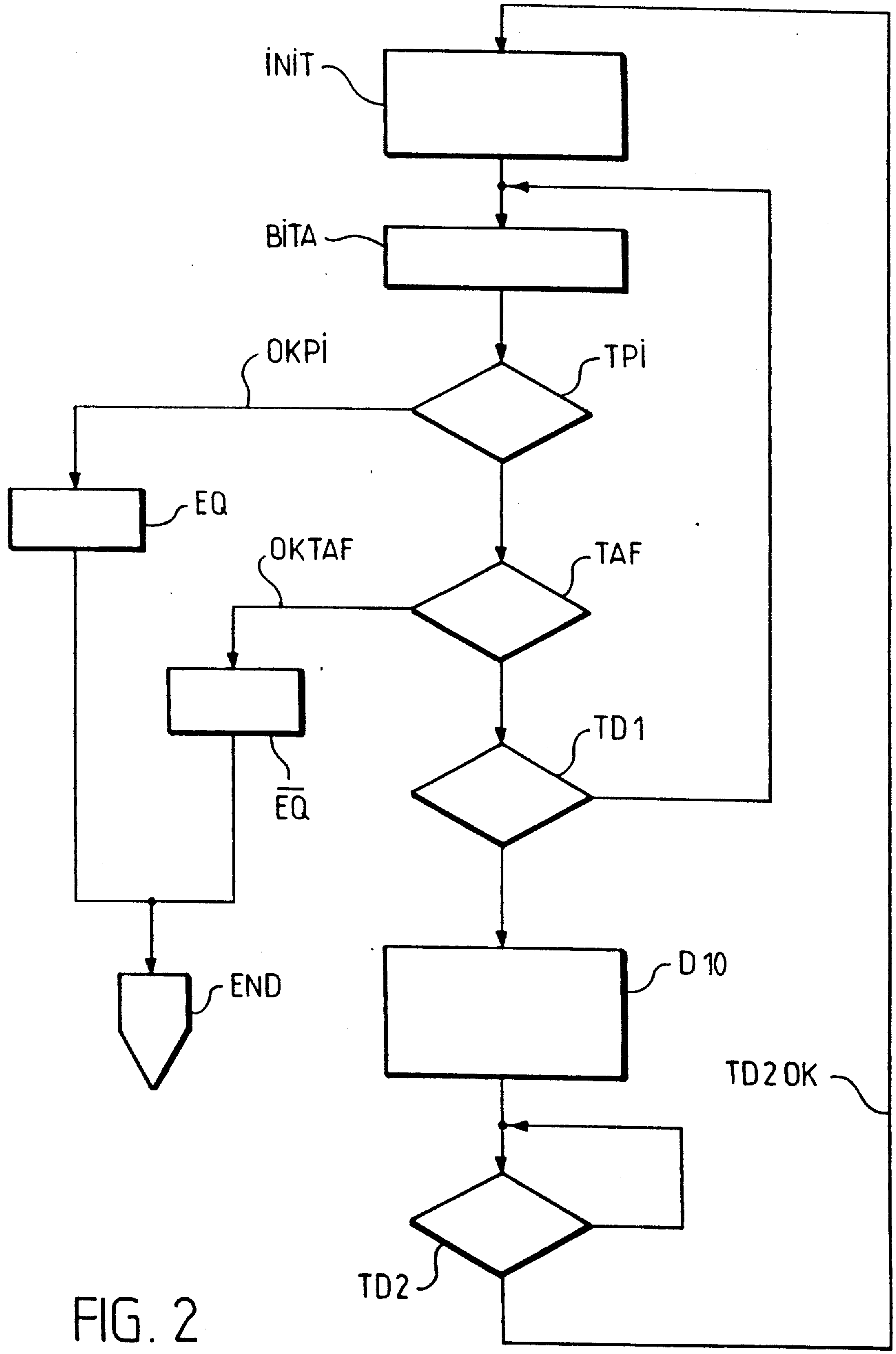
FIG. 2 shows the steps of the method, according to the invention.

This verification is effected in accordance with the procedure illustrated in FIG. 2.

When the control unit initiates (INIT) the verification procedure, it gives the tuner an indication of the frequency of the selected alternative channel, it mutes the amplifier and it starts a downcounter with periods 'd1'.

The signals are received on the alternative channel and the RDS data are applied to the demodulator and the decoder. The decoder also receives a special command (CKPI) from the control unit and at that moment each received bit is stored in a table (BITA) of the decoder; during the period between the reception of two consecutive bits (this period is of the order of one millisecond), the decoder has the time to verify (TPI) whether the table contains a configuration of bits which is identical to that of the identification of the program (PI) of the current channel. The PI comprises 16 bits which are repeated every 104 received bits, thus as soon as 16 bits have been received, there is a small chance that these are the PI bits; in practice two aspects are verified: 1) equal to PI or not (TPI) and 2) full table or not (TAF).

In the case of equality of the PI (OKPI) the verification is ended (END) after having set an equality signal (EQ).

In the opposite case and if the table is full (OKTAF) i.e. when at least 104 consecutive bits have been received and stored in the table, the verification is also ended, but this time negatively ($\overline{EQ}$).

If the table is not full, the arrival of the next bit has to be awaited in order to proceed to the same verifications again (BITA).

During this waiting time (TD1) it may occur that the 'd1' downcounter reaches zero, in which case (D10) the control unit provides the user with the possibility of resuming listening to the current channel by giving the tuner the frequency of the current channel and by putting the amplifier into operation again.

At this moment a downcounter with a period of 'd2' is started (TD2) and when it reaches zero (TD2OK) the above-mentioned operations (INIT) are again performed until the signal EQ or $\overline{EQ}$ is set.

When the signal EQ, or $\overline{EQ}$ is set, it is preferable to delete the contents of the table in order to ensure a satisfactory verification of a subsequent PI. Alternatively, if an acquisition (=reception) error is to be expected, the contents of the table should be preserved and provided bit by bit while continuing the acquisition and the verification test.

This sequence of operations in a duty cycle dictated by the downcounters 'd1' and 'd2' has for its object to acquire the RDS data of the alternative channel in a manner which is inaudible to the listener.

To this end, the period 'd1' is of such a short duration that the listener does not notice the interruption of the program being listed to. This is the case, for example, when 'd1' is equal to 2 hundredths of a second which is sufficiently long to acquire 23 bits arranged consecutively in the table when the transmission rate is 1,187.5 bits/sec ($23=1{,}187.5\times 0.02$). The period 'd2' should be measured in such a way that the position of arranging a second sequence of 23 bits in the table is known. The measurement may be realized either in the control unit or in the decoder, or in both of them when the periods 'd1' and/or 'd2' are not constant. In fact, it seems to be more economical to work with constant periods, but this is not necessary and the period 'd2' may particularly depend on other tasks of the control unit. In the case of RDS, the transmitted bits are repeated every 104 bits and it is clear that the period 'd2' should necessarily be different from '$N-d1+i.N$, or else the acquired bits would always be the same; in practice 'd2' should be different from 81, 185, 284 . . . .

Advantageously, '$d2=104+(n\times 104)$ bits (104, 208, 312, 415, . . . . . ) or '$d2=(104-(2\times 23))+(m\times 104)$ bits (58, 162, 266, 370, 474, . . . . ) so that in the two cases the acquired bits can be linked together in the table with the bits already stored and the chances of rapidly acquiring the PI bits are improved.

The values indicated by 'd1' and 'd2' are clearly indicative, it being important to acquire the alternative PI by successive samplings without producing interruption which are audible to the user, even if the car radio has only one tuner.

The verification operations of the alternative PI necessitate the following means in addition to the elements shown in FIG. 1:

a table (BITA) with its filling indicator, a downcounter with a period of 'd1', a downcounter with a period of 'd2' (which can be combined with 'd1' when they do not "work" simultaneously but alternately), a PI comparator for comparing 16 arbitrary but successive bits in the table with the PI of the current channel.

These means can be assembled in a special module adequately connected to the control unit and the decoder. It is advantageous to use the means already existing in the decoder which thus becomes a decoder-test unit having two functions alternately carried out in accordance with the setting of a supplementary digital signal CKPI; the result of the test is transmitted to the control unit by means of a supplementary connection (EQ). As the case may be, the decoder functions in the decoder mode or in the test mode; in the test mode the connection DATAR may be used for giving the control unit an indication about the position of the test signal EQ or $\overline{EQ}$.

We claim:

1. A receiver including means for acquisition and comparison of signals from a first channel and a second channel, said signals including a repetitive group of N data (N being a positive integer) particularly having an identification code for the channel containing said signals, referred to as the current channel, and at least a tuning search indication for another channel, referred to as the alternative channel, said receiver being tuned to receive signals in a current channel whose identification code has been stored, characterized in that said means for acquisition and comparison comprises:

means for tuning said receiver to receive signals in said current channel;

a decoder for processing the signals received by said tuning means, said decoder comprising means for storing one group of said repetitive group of N data of the signals transmitted in said current channel; and means for controlling said tuning means to repetitively tune said receiver to signals in said alternative channel for a first predetermined time-period d1, said time-period d1 being shorter than the transmission period of a single group of N data, and, alternatively, to said signals in said current channel for a second predetermined time-period d2; wherein said decoder further comprises:

means for cumulatively storing data of the signals in said alternative channel during each of the time-periods d1;

first means for comparing the stored identification code of the current channel and the identification code in the stored data of the alternative channel, said first comparing means stopping said controlling means for repetitively tuning said tuning means to said alternative channel when said comparison shows an equality; and second means for comparing the number of said stored data of the alternative channel with said number N of data in a group, said second comparing means stopping said controlling means for repetitively tuning said tuning means to said alternative channel when said comparison shows that the number of said stored data of said alternative channel is equal to or greater than said number N of data.

2. A receiver as claimed in claim 1, in which the signals from one of said channels comprise an audio modulation component and a digital modulation component, wherein said repetitive group of N data comprise said digital modulation component, characterized in that said period 'd1' is sufficiently short in combination with a sufficiently long period 'd2' for the interruption(s) of the current audio modulation component to be imperceptible to a listener.

3. A receiver as claimed in claim 2, in which the signals from the channel are modulated in accordance with the RDS system, i.e. N=104 bits transmitted at a rate of 1,187.5 bits/sec and in which said identification code comprises 16 bits, characterized in that the time-period d1 is less than or equal to 0.02 seconds and in that the time-period d2 is equal to $104+(n\times 104)$ bits ('n' is a positive integral or zero) so that the alternative bits received during the time-periods d1 can be linked together with the alternative bits already stored in the cumulative storing means.

4. A receiver as claimed in claim 2, in which the signals from the channel are modulated in accordance with the RDS system, i.e. N=104 bits transmitted at a rate of 1,187.5 bits/sec and in which said identification code comprises 16 bits, characterized in that the time-period d1 is less than or equal to 0.02 second and in that the time-period d2 is equal to $58+(m\times 104)$ bits ('m' is a positive integral or zero) so that the alternative bits received during the time-periods d1 can be linked together with the alternative bits already stored in the cumulative storing means.

* * * * *